United States Patent
Dasgupta et al.

(10) Patent No.: US 9,178,772 B2
(45) Date of Patent: Nov. 3, 2015

(54) CUMULATIVE NODE HEARTBEAT RELAY AGENTS IN CONSTRAINED COMPUTER NETWORKS

(71) Applicant: Cisco Technology, Inc., San Jose, CA (US)

(72) Inventors: Sukrit Dasgupta, Norwood, MA (US); Jean-Philippe Vasseur, Saint Martin d'Uriage (FR); Grégory Mermoud, Veyras (CH)

(73) Assignee: Cisco Technology, Inc., San Jose, CA (US)

( * ) Notice: Subject to any disclaimer, the term of this patent is extended or adjusted under 35 U.S.C. 154(b) by 183 days.

(21) Appl. No.: 13/926,761

(22) Filed: Jun. 25, 2013

(65) Prior Publication Data
US 2014/0379900 A1    Dec. 25, 2014

(51) Int. Cl.
*H04L 12/26* (2006.01)
*H04L 12/24* (2006.01)

(52) U.S. Cl.
CPC .......... *H04L 41/145* (2013.01); *H04L 43/0805* (2013.01); *H04L 43/10* (2013.01)

(58) Field of Classification Search
CPC ..... H04L 43/06; H04L 43/10; H04L 43/0811; H04L 41/12; G06F 11/0751
See application file for complete search history.

(56) References Cited

U.S. PATENT DOCUMENTS

| | | | |
|---|---|---|---|
| 7,174,387 B1 * | 2/2007 | Shand et al. | 709/238 |
| 7,228,421 B1 | 6/2007 | Huang et al. | |
| 7,451,359 B1 * | 11/2008 | Coekaerts | 714/48 |
| 7,587,465 B1 * | 9/2009 | Muchow | 709/209 |
| 8,160,055 B1 | 4/2012 | Nadeau et al. | |
| 8,644,164 B2 * | 2/2014 | Averi et al. | 370/238 |
| 2005/0007964 A1 * | 1/2005 | Falco et al. | 370/256 |
| 2006/0171320 A1 | 8/2006 | Vasseur et al. | |
| 2008/0040509 A1 * | 2/2008 | Werb et al. | 709/242 |
| 2008/0080507 A1 | 4/2008 | Swallow et al. | |
| 2008/0225852 A1 | 9/2008 | Raszuk et al. | |
| 2008/0259923 A1 | 10/2008 | Bryant et al. | |
| 2008/0288607 A1 | 11/2008 | Muchow | |
| 2009/0043887 A1 * | 2/2009 | Coekaerts | 709/224 |
| 2009/0310485 A1 * | 12/2009 | Averi et al. | 370/232 |
| 2009/0322518 A1 * | 12/2009 | Liang et al. | 340/539.18 |
| 2010/0146324 A1 | 6/2010 | Sajassi et al. | |

OTHER PUBLICATIONS

Winter, et al., "RPL: IPv6 Routing Protocol for Low-Power and Lossy Networks", Request for Comments 6550, Mar. 2012, 157 pages, Internet Engineering Task Force Trust.

* cited by examiner

*Primary Examiner* — Nadeem Iqbal
(74) *Attorney, Agent, or Firm* — Parker Ibrahim & Berg LLC; James M. Behmke; Stephen D. LeBarron

(57) ABSTRACT

In one embodiment, a message instructing a particular node to act as a heartbeat relay agent is received at the particular node in a network. The particular node is selected to receive the message based on a centrality of the particular node. Heartbeat messages are then collected from child nodes of the particular node in the network. Based on the collected heartbeat messages, a heartbeat report is generated, and the report is transmitted to a collecting node in the network.

20 Claims, 8 Drawing Sheets

CUMULATIVE NODE HEARTBEAT RELAY AGENTS IN CONSTRAINED COMPUTER NETWORKS

TECHNICAL FIELD

The present disclosure relates generally to computer networks, and, more particularly, to cumulative node heartbeat relay agents in computer networks.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. Due to the intermittent nature of LLNs, an important requirement is to keep track of the availability of the nodes in the network. This may be done, for example, using "heartbeats" that network devices send to a root device, and eventually relayed to a centralized management device, e.g., Network Management Server (NMS). As a result, the network operator is informed of the availability of various network devices.

BRIEF DESCRIPTION OF THE DRAWINGS

The embodiments herein may be better understood by referring to the following description in conjunction with the accompanying drawings in which like reference numerals indicate identically or functionally similar elements, of which.

Figure 1:
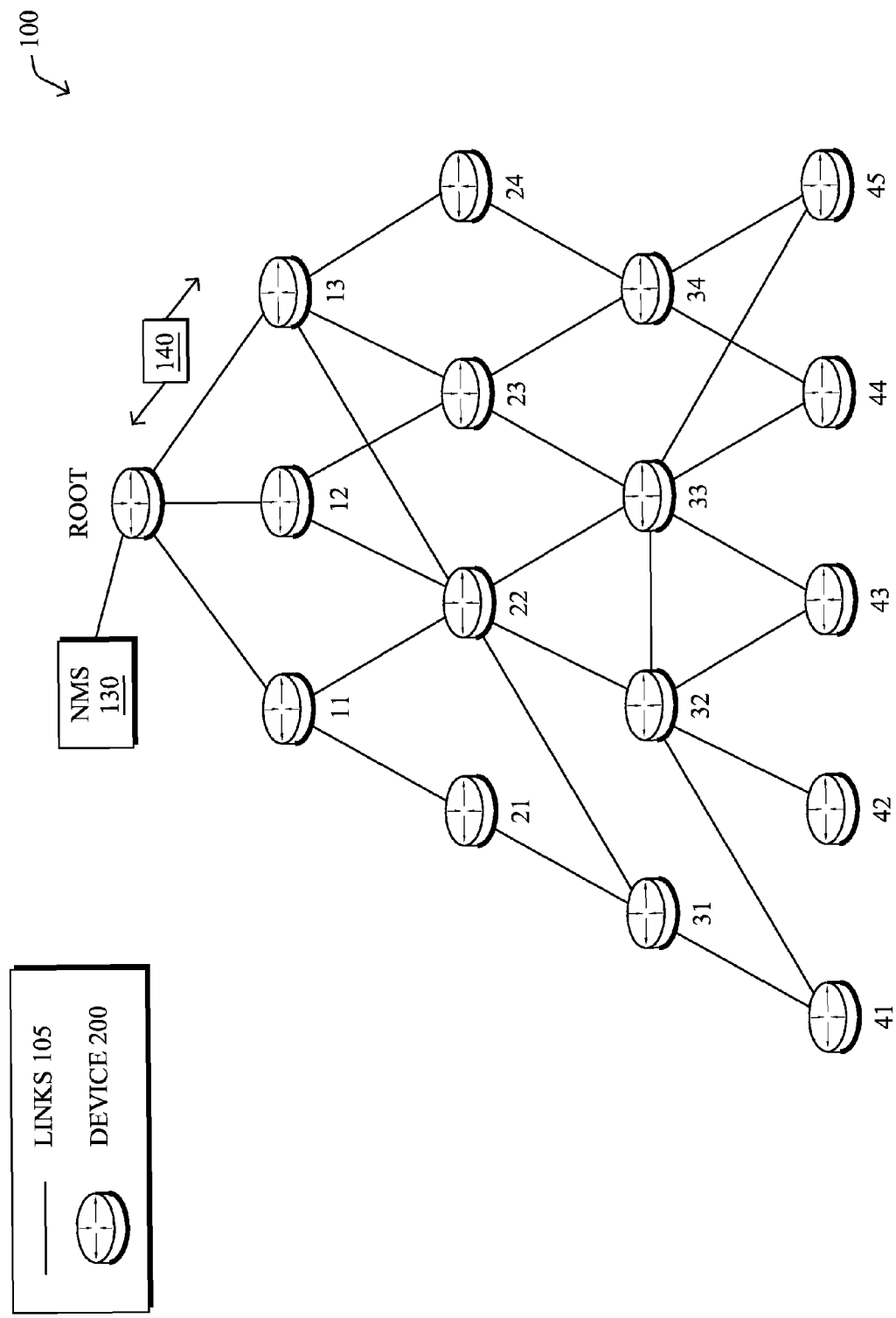
FIG. 1 illustrates an example communication network.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DESCRIPTION OF EXAMPLE EMBODIMENTS

Overview

According to one or more embodiments of the disclosure, a message instructing a particular node to act as a heartbeat relay agent is received at the particular node in a network. The particular node is selected to receive the message based on a centrality of the particular node. Heartbeat messages are then collected from child nodes of the particular node in the network. Based on the collected heartbeat messages, a heartbeat report is generated, and the report is transmitted to a collecting node in the network.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communication links located in the same general physical location, such as a building or campus. WANs, on the other hand, typically connect geographically dispersed nodes over long-distance communication links, such as common carrier telephone lines, optical lightpaths, synchronous optical networks (SONET), synchronous digital hierarchy (SDH) links, or power-line communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. For the purposes of the present disclosure, the computer network 100 may be of any suitable type of network, including, but limited to, an LLN. Further, the devices 200 may be referred to as "devices" or "nodes" interchangeably.

Those skilled in the art will further understand that while the network is shown in a certain orientation, particularly with a "root" node, the network 100 is merely an example illustration that is not meant to limit the disclosure. A network management server (NMS) 130 may be in communication with the network 100, such as via the root node, e.g., a field area router (FAR), over a WAN or cellular network.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
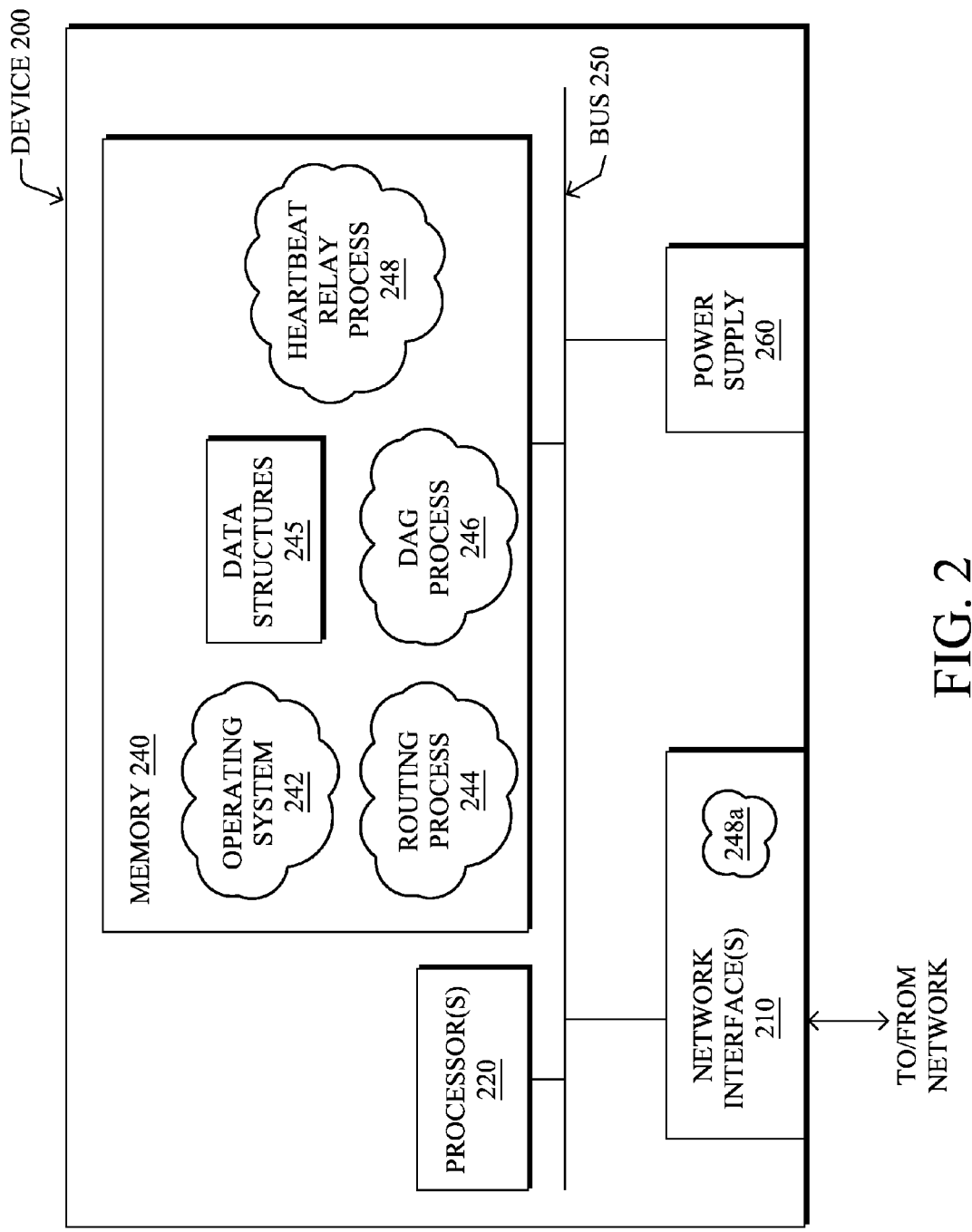
FIG. 2 illustrates an example schematic view of a network device/node.

FIG. 2 is a schematic block diagram of an example node/device 200 that may be used with one or more embodiments described herein, e.g., as shown in FIG. 1. The device may comprise one or more network interfaces 210 (e.g., wireless/channel-hopping), at least one processor 220, and a memory 240 interconnected by a system bus 250, as well as a power supply 260 (e.g., plug-in, battery, etc.), all of which may be interconnected by a system bus 250.

The network interface(s) 210, e.g., transceivers, contain the mechanical, electrical, and signaling circuitry for communicating data over wireless links 105 coupled to the network 100. The network interfaces may be configured to transmit and/or receive data using a variety of different communication protocols as noted above and as will be understood by those skilled in the art. The device 200 may have multiple different types of network interfaces 210, e.g., wireless and wired/physical connections, and that the view herein is merely for illustration. Also, while the network interface 210 is shown separately from power supply 260, in the case of PLC, for example, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor(s) 220 and the network interface(s) 210 for storing software programs and data structures associated with the embodiments described herein. Note that certain devices may have limited memory or no memory (e.g., no memory for storage other than for programs/processes operating on the device). The processor(s) 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a directed acyclic graph (DAG) process 246, and an illustrative "heartbeat relay" process 248, as described herein. Note that while the heartbeat relay process 248 is shown in centralized memory 240, alternative embodiments provide for the process, or portions thereof, to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor(s) 220 to perform functions provided by one or more routing protocols, such as proactive or reactive routing protocols as will be understood by those skilled in the art. These functions may, on capable devices, be configured to manage a routing/forwarding table (e.g., a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR).

Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as low-power and lossy networks (LLNs). LLNs, e.g., certain sensor networks, may be used in a myriad of applications such as for "Smart Grid" and "Smart Cities." LLNs are comprised of anything from a few dozen and up to thousands or even millions of LLN routers, and support point-to-point traffic (e.g., between devices inside the LLN), point-to-multipoint traffic (e.g., from a central control point, such as the root node, to a subset of devices inside the LLN) and multipoint-to-point traffic (e.g., from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by DAG process 246 and/or routing process 244) based on an Objective Function (OF). The role of the Objective Function is generally to specify rules on how to build the DAG (e.g. number of parents, backup parents, etc.).

Figure 3:
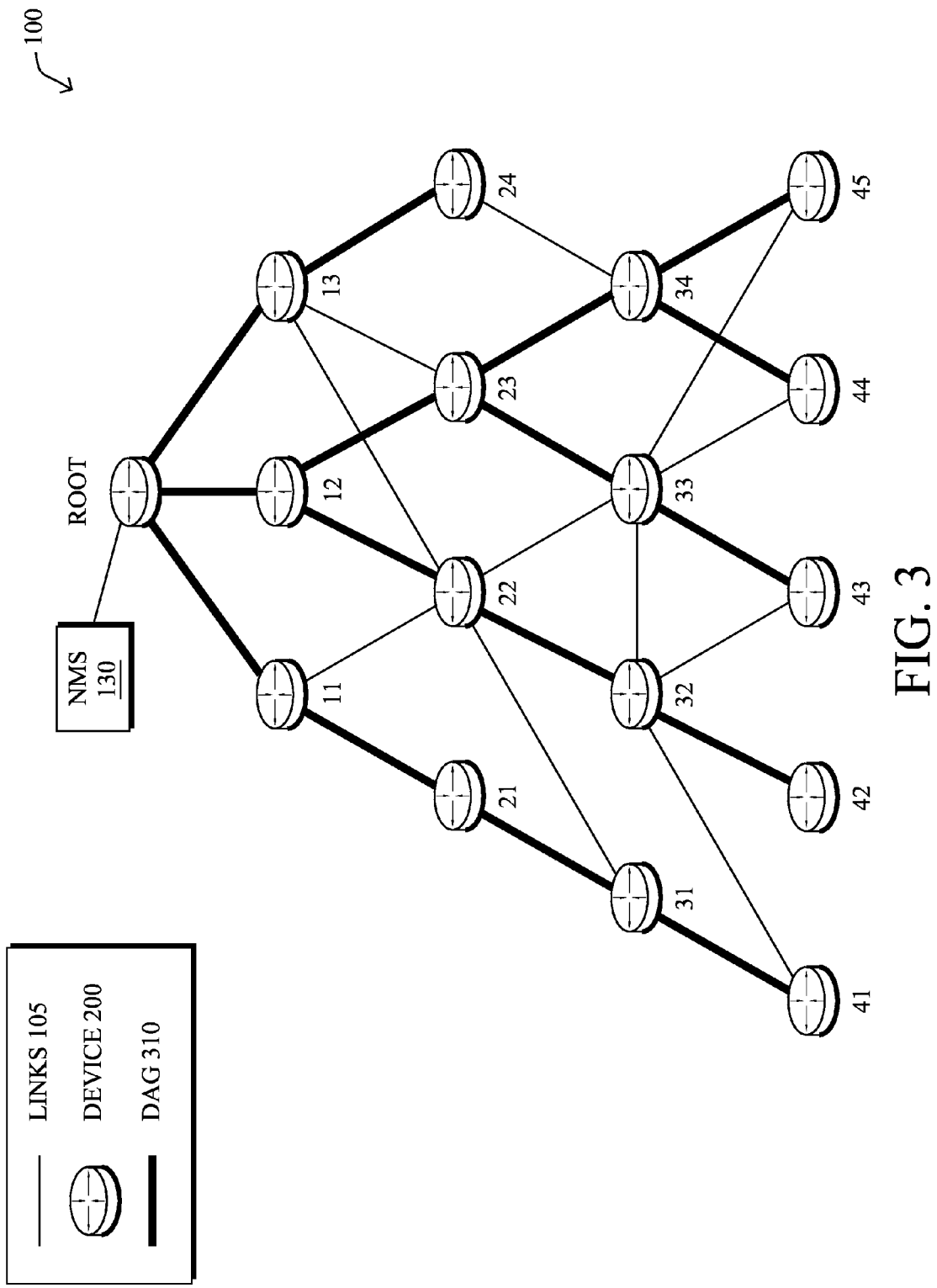
FIG. 3 illustrates an example simplified directed acyclic graph (DAG) in the communication network.

FIG. 3 illustrates an example simplified DAG that may be created in accordance with the properties described above within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node 130 toward one or more leaf nodes (nodes without child). Traffic/packets 140 (shown in FIG. 1) may then traverse the DAG 310 in either the upward direction toward the root or downward toward the leaf nodes, particularly as described herein.

As noted above, an important requirement is to keep track of the availability of network nodes, given the intermittent nature of LLNs. This may be done, for example, using "heartbeats" that devices send to a root device, and eventually relayed to a centralized management device, e.g., NMS. The heartbeat indicates a liveness of the corresponding node. Conversely, the lack of a heartbeat may indicate that the corresponding node is inactive. As a result, the network operator is informed of the availability of various network devices.

In modestly-sized network topologies, e.g., 200-1000 nodes, heartbeats are transmitted relatively infrequently to reduce the total channel usage arising from sending the heartbeats. However, reducing the heartbeat reporting by too much can make the system virtually irrelevant as the current state of the network is never represented accurately at the control center. Naturally, this is highly inefficient as a network operator could potentially wait long hours before it is known that the node has transitioned from being active to inactive. Accordingly, the efficiency of a heartbeat reporting system depends on reducing total channel usage, while simultaneously maintaining timely heartbeat transmissions.

Cumulative Node Heartbeat Relay Agents

The techniques herein provide a mechanism by which node availability can be reported more frequently, while also using channel capacity more efficiently. In particular, the techniques allow for delivering information about node availability/liveness in a network, e.g., LLN. Existing mechanisms of the same are highly conservative in order to preserve channel capacity, especially in large scale networks. According to the disclosed embodiments, a subset of nodes is selected as heartbeat agents based on their computed centrality in the topology. Going forward, these nodes consume the application heartbeat information of their respective sub-DAG and may relay information using either positive or negative lists. This reduces channel use significantly while still keeping aggressive heartbeat timers. The embodiments also have components to handle node movement from one sub-DAG to another while keeping the same model of efficiency. Notably, the embodiments combine application-layer heartbeats and network states (e.g., routing topology, congestion, etc.), in order to dynamically trigger the consumption of application heartbeats from within the network, and thus dramatically improve the overall performance and timely liveness node detection.

Specifically, according to one or more embodiments of the disclosure as described in detail below, a message instructing a particular node to act as a heartbeat relay agent is received at the particular node in a network. The particular node is selected to receive the message based on a centrality of the particular node. Heartbeat messages are then collected from child nodes of the particular node in the network. Based on the collected heartbeat messages, a heartbeat report is generated, and the report is transmitted to a collecting node in the network.

Illustratively, the techniques described herein may be performed by hardware, software, and/or firmware, such as in accordance with the "heartbeat relay" process 248/248a, which may contain computer executable instructions executed by the processor 220 (or independent processor of interfaces 210) to perform functions relating to the techniques described herein, e.g., in conjunction with routing process 244 (and/or DAG process 246). For example, the techniques herein may be treated as extensions to conventional protocols, such as the various PLC protocols or wireless communication protocols, and as such, may be processed by similar components understood in the art that execute those protocols, accordingly.

Operationally, the techniques herein generally relate to, but are not limited to, accumulating heartbeat messages in computer networks using heartbeat relay agent nodes, and in particular, an application-layer based mechanism by which node availability can be measured frequently without placing excessive burdens on network channel capacity. Such a mechanism may be applicable to various LLN applications including, for example, Connected Energy grids, Smart Cities, Connected Vehicles, Industrial automation, and the like. The mechanism may be implemented in various ways, including, for example, in edge router/switch products, as well as end node IPv6 stacks.

Figure 4:
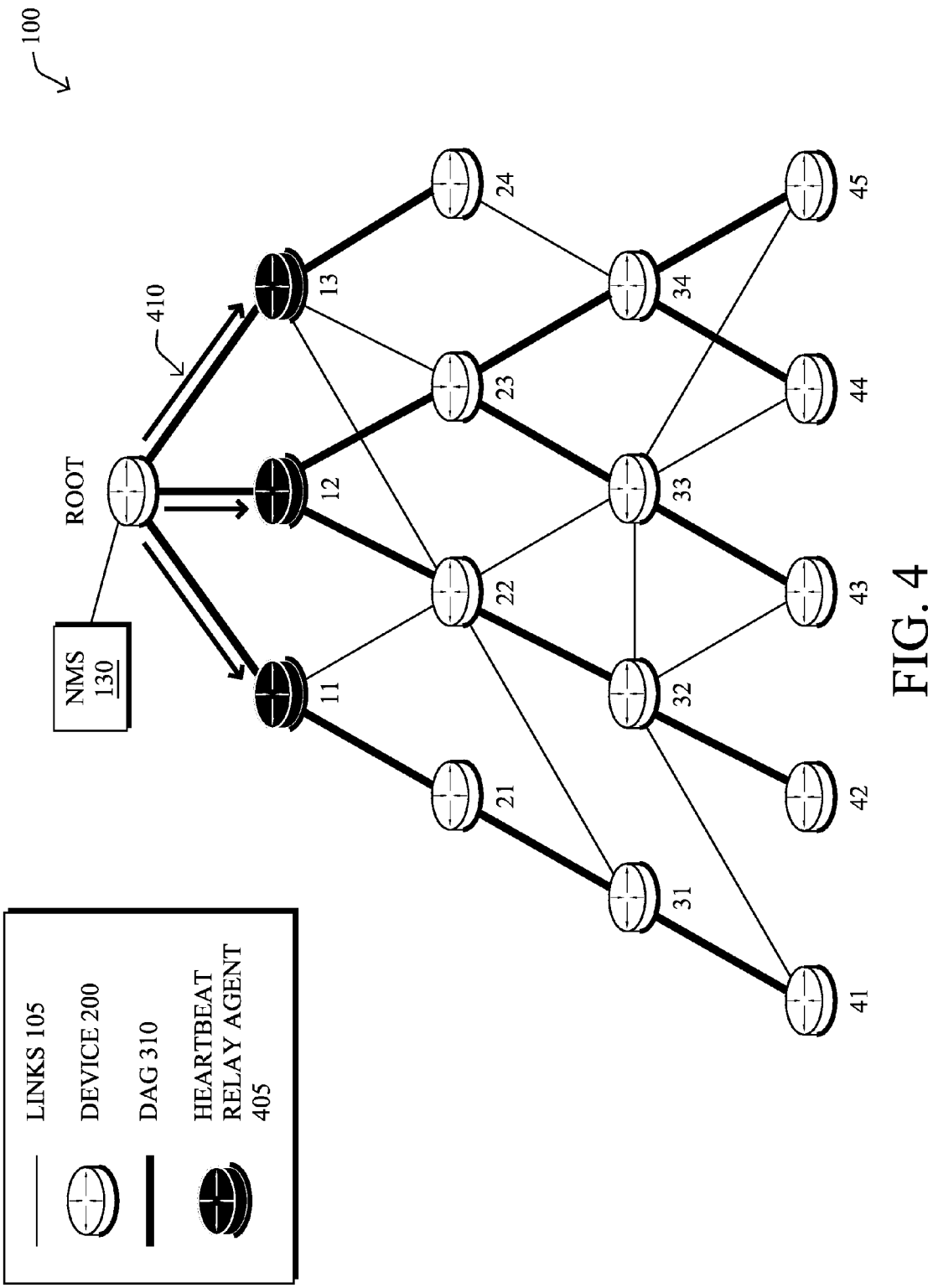
FIG. 4 illustrates an example set of heartbeat relay agent nodes.

FIG. 4 illustrates an example set of heartbeat relay agent nodes. As shown in FIG. 4, the communication network 100 includes multiple devices 200 interconnected via communication links 105, whereby a subset of the devices are designated as heartbeat relay agents 405. The heartbeat relay agents 405 are network devices which may be configured in the same or similar manner as other network devices 200. There may be a single or multiple heartbeat relay agents 405 within in a particular DAG.

The heartbeat relay agents 405 act as a cumulative agent for heartbeat messages of the child in its sub-DAG. The "sub-DAG" refers to the network tree under a particular node, whereby the heartbeat relay agent node 405 acts as a root node of its respective sub-DAG. The devices 200 which comprise the sub-DAG, other than the heartbeat relay agent 405 itself, are considered the child nodes of the corresponding heartbeat relay agent node. As the root of the sub-DAG, any transmission from the child nodes to the DAG root node must pass through the heartbeat relay agent nodes 405. Therefore, the heartbeat relay agents 405 may be operable to receive and accumulate each heartbeat intended for the DAG root from its child nodes.

The heartbeat relay agent devices 405 may be selected to act as the heartbeat relay agents based on a centrality of those devices. As should be understood to one skilled in the art, in a routing topology such as a DAG, certain nodes are more important than others in terms of location in the computed routing topology. Nodes which are used as common transit points for many other nodes are more "centrally" located, and thus have a high "centrality" within the network. The notion of centrality may be used to describe a routing topology property derived from an algorithm computed by a routing protocol or a path computation engine, whereby the property reflects a number of paths in the network transiting through a particular node.

The centrality computation may be performed by a "collecting node," e.g., the DAG root node or a centralized management node (e.g., NMS). The centrality may be computed using various methods, including, for example, observing the network topology, node activity, congestion amount, network stability, etc., and statistically tracking these properties over time. As would be apparent, an understanding of the network routing topology may be necessary for the computation to be performed. The topology may be understood using either a reactive or proactive routing protocol, as described above. When a reactive routing protocol is in use, for example, a set of paths computed in the network may be gathered from the nodes in the network via a data message, and then provided to the centrality computing node.

After the centrality metric is computed, the heartbeat relay agent devices 405 may each receive a message including an instruction to act as a heartbeat relay agent. The received message/instruction may be in the form of a data message 410, e.g., CoAP Simple Management Protocol (CSMP) message, transmitted by the collecting node. Upon receipt of the message, each recipient 405 may henceforth operate as a heartbeat relay agent.

Figure 5:
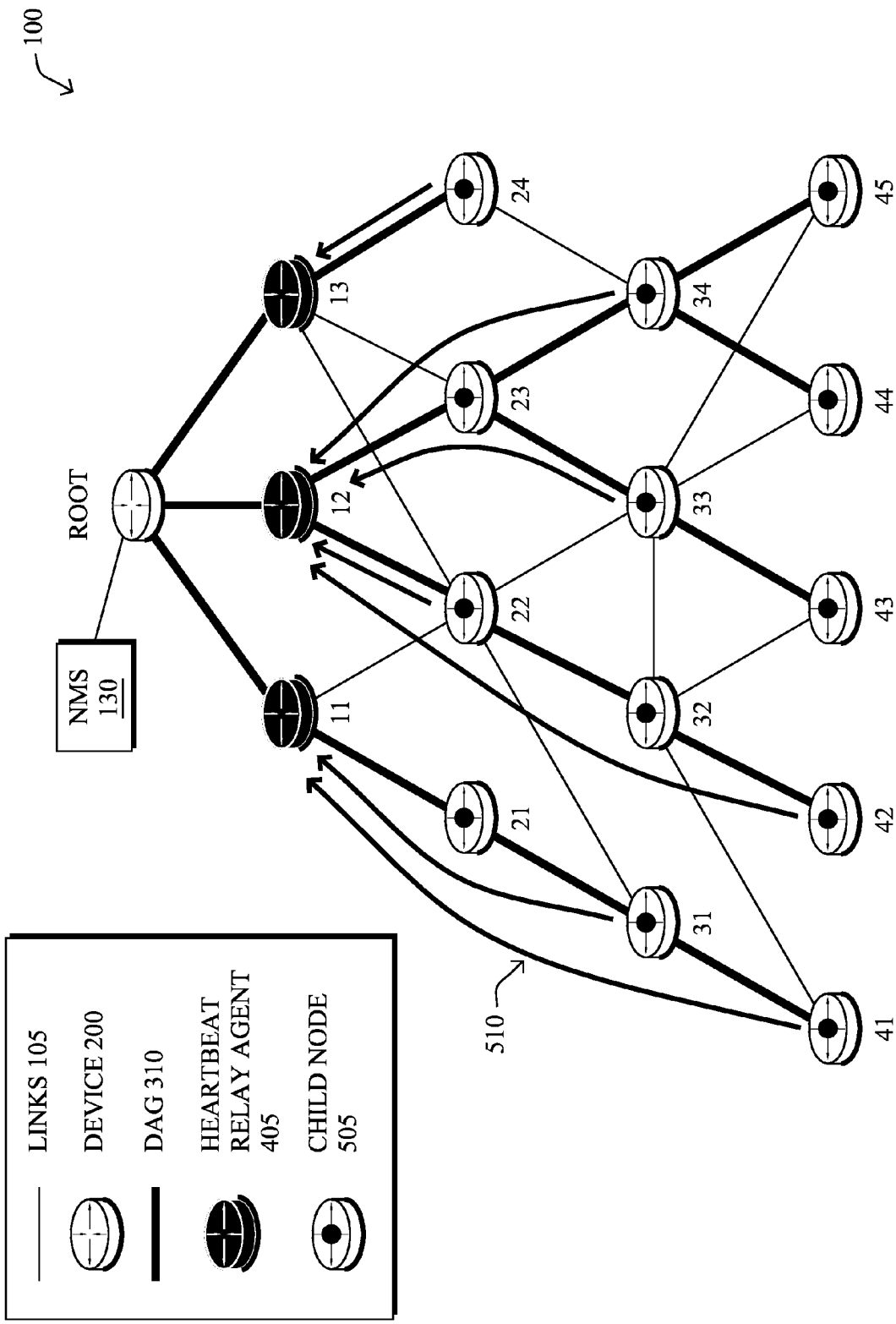
FIG. 5 illustrates an example of collecting heartbeat message transmissions.

FIG. 5 illustrates an example of collecting heartbeat message transmissions. As shown in FIG. 5, the communication network 100 includes multiple devices 200 interconnected via communication links 105, whereby each heartbeat relay agent 405 has one or more child nodes 505. As described above, the child nodes 505 are the devices 200 which are located "beneath," i.e., deeper than, a respective heartbeat relay agent node 405, and need not merely be nodes that claim the heartbeat relay agent node to be their immediate parent.

Each heartbeat relay agent 405 collects the heartbeat messages 510 transmitted from its respective child nodes 505. As illustrated in FIG. 5, for example, the heartbeat relay agent node "11" is operable to receive any heartbeats 510 transmitted from child nodes "21," "31," and "41." With respect to the DAG formulated in the network 100, the heartbeat 510 may be transmitted along the DAG paths 310 to the collecting heartbeat relay agent 405. However, the heartbeat 510 may be transmitted along any suitable path, e.g., communication link 105, toward the heartbeat relay agent 405, depending on the topology of the particular network.

A received heartbeat message may indicate a liveness of the corresponding child node 505, i.e., the child node which sent the heartbeat. Importantly, for the purposes of the present disclosure, the heartbeat message may be an explicit data packet, or the heartbeat message may simply be information "piggybacked" on another packet. The heartbeat relay agent nodes 405 may use, for example, Deep Packet Inspection (DPI) to detect the heartbeat 510 and determine its sender. Conversely, the lack of a heartbeat 510 may indicate that the corresponding node is currently inactive. In particular, a child node 505 which has not sent a heartbeat 510 in a given amount of time may be considered by the corresponding heartbeat relay agent 405 to be inactive. Notably, no special configuration may be required for the child nodes 505, i.e., the heartbeat messages 510 are transmitted as normal.

The heartbeat messages 510 may be transmitted from any number of child nodes 505. For example, in FIG. 5, with respect to the sub-DAG of heartbeat relay agent node "12," heartbeat messages 510 are transmitted from child nodes "22," "33," "34," and "42"; whereas, heartbeat messages are not transmitted from child nodes "23," "32," "43," "44," and "45." As a result, the collecting node, e.g., DAG root node or NMS, which receives a heartbeat report sent from the heartbeat relay agent (as shown in FIG. 6), can determine which child nodes 505 are active or inactive.

It should be understood that it is possible for a child node 505 to migrate to a different sub-DAG. In this case, the migrating child node 505 may change its "parent," and a new heartbeat relay agent 405 may be utilized. By selecting at least one heartbeat relay agent 405 in each sub-DAG, it may be ensured that there is a heartbeat relay agent to collect the heartbeats 510 of the child node 505, regardless of the sub-DAG in which the child node resides. Once a child node 505 joins a new sub-DAG, the heartbeat relay agent 405 may forward its initial heartbeat to the NMS, which will inform the NMS that the child node is currently active and has moved to a new sub-DAG.

Figure 6:
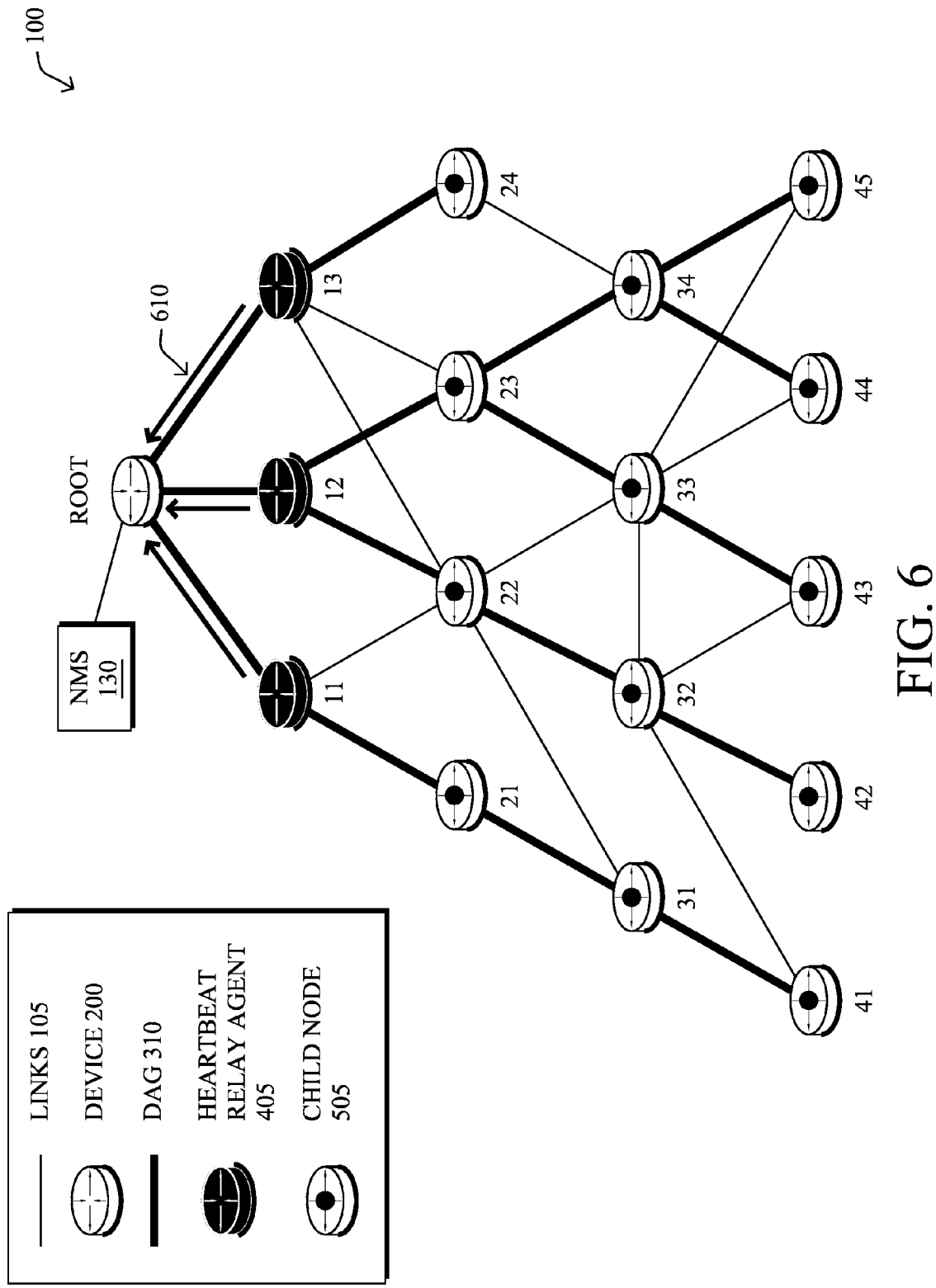
FIG. 6 illustrates an example of generating and transmitting heartbeat reports.

FIG. 6 illustrates an example of generating and transmitting heartbeat reports. As shown in FIG. 6, the communication network 100 includes multiple devices 200 interconnected via communication links 105, whereby each heartbeat relay agent 405 has collected the heartbeat messages, if any, transmitted from the one or more child nodes 505.

After collecting heartbeat messages from the child nodes 505, each heartbeat relay agent 405 may generate a heartbeat report based on the respectively collected heartbeat messages. Then, rather than forwarding each received heartbeat to the collecting node, the respective heartbeat relay agent 405 may instead transmit the generated heartbeat report (shown as "610" in FIG. 6). Specifically, the heartbeat report may be transmitted towards the DAG root node, then relayed to the NMS.

The heartbeat report may indicate a liveness of the child nodes 505 by encoding a list of child nodes based on the collected heartbeats. In this regard, the heartbeat relay agent 405 may determine whether to indicate in the heartbeat report: a list of child nodes 505 from which a heartbeat message was received ("positive list"), or in the alternative, a list of child nodes 505 from which a heartbeat message was not received ("negative list"). The heartbeat relay agent 405 may then encode the determined list in the heartbeat report. For example, as illustrated in FIG. 5, with respect to the sub-DAG of heartbeat relay agent node "12," a positive list may be generated including child nodes "22," "33," "34," and "42"; whereas, a negative list may be generated including child nodes "23," "32," "43," "44," and "45."

The heartbeat relay agent 405 may determine whether to encode a positive list or a negative list based on a multitude of factors, including, for example, a number of active child nodes, a frequency of heartbeat message transmissions, an amount of congestion in the network, a topology of the network, a stability of the network, and the centrality of the particular node. For instance, if a particular node has a low centrality and an unstable DAG, the node may preferably use a positive list, which indicates child nodes from which heartbeats have been received. In contrast, a node which has a high centrality, stable sub-DAG, and receives frequent heartbeats from its child nodes, the node may preferably use a negative list, which indicates child nodes from which heartbeats have not been received.

In the alternative, the heartbeat relay agents 405 may be instructed by the collecting node, e.g., the DAG root node or NMS, to encode either the positive list or negative list. More specifically, the heartbeat relay agent 405 may receive a message, e.g., a CSMP message, including an instruction from the collecting node to indicate in the heartbeat report the list of child nodes from which a heartbeat message was received, or a list of child nodes from which a heartbeat message was not received. The collecting node may instruct the heartbeat relay agents 405 based on the factors referenced above.

As described above, it is possible for a child node 505 to migrate to a different sub-DAG. In this case, the heartbeat relay agent 405 may receive a message indicating that a child node 505 has migrated to another area of the network, e.g., another sub-DAG. The message may be sent from the collecting node to inform each heartbeat relay agent 405 that used to collect heartbeats from migrated child nodes that they should no longer report those nodes. Thus, upon receipt of the message, the heartbeat relay agent 405 may remove the migrated child node from the list (in the case that a negative list is encoded). Moreover, since all generated heartbeat reports traverse the DAG root node, before reaching the NMS, the root node may be configured to filter out contradicting information about the same child node 505 using timestamps or correlating information obtained from routing packets, e.g., when multiple heartbeat relay agents 405 report that the same child node is active in their respective sub-DAG.

In the case that a heartbeat relay agent 405 encodes a negative list, i.e., the list of child nodes 505 from which a heartbeat message has not been received, the heartbeat relay agent may alter its reporting in order to stop sending incorrect information. In particular, the heartbeat relay agent 405 may remove a child node 505 from the list when the child node has been included in the list for a number of consecutive transmissions which exceeds a predetermined threshold.

Figure 7:
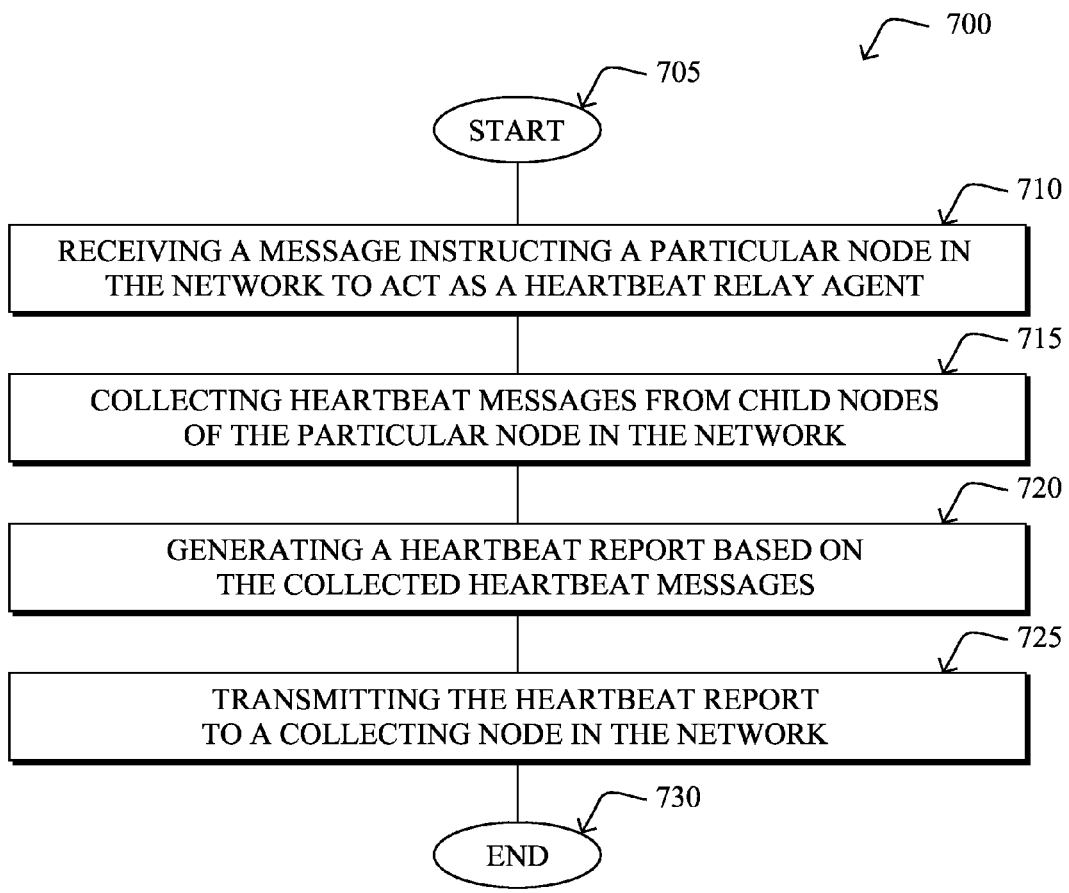
FIG. 7 illustrates an example simplified procedure for collecting heartbeat messages and generating a heartbeat report at a heartbeat relay agent in the communication network.

FIG. 7 illustrates an example simplified procedure for collecting heartbeat messages and generating a heartbeat report at a heartbeat relay agent in the communication network. As shown in FIG. 7, the procedure 700 may start at step 705, continue to step 710, and so forth, where, as described in greater detail above, heartbeat messages are collected and a heartbeat report is generated at a heartbeat relay agent.

At Step 710, the procedure 700 includes receiving, at a particular node in a network, a message instructing the particular node to act as a heartbeat relay agent. The particular node is selected to receive the message based on a centrality of the particular node, as described above. At Step 715, heartbeat messages are collected from child nodes of the particular node in the network. At Step 720, a heartbeat report is generated based on the collected heartbeat messages. At Step 725, the heartbeat report is transmitted to a collecting node in the network. The techniques by which the steps of procedure 700 are performed, as well as ancillary procedures, are described in detail above.

Figure 8:
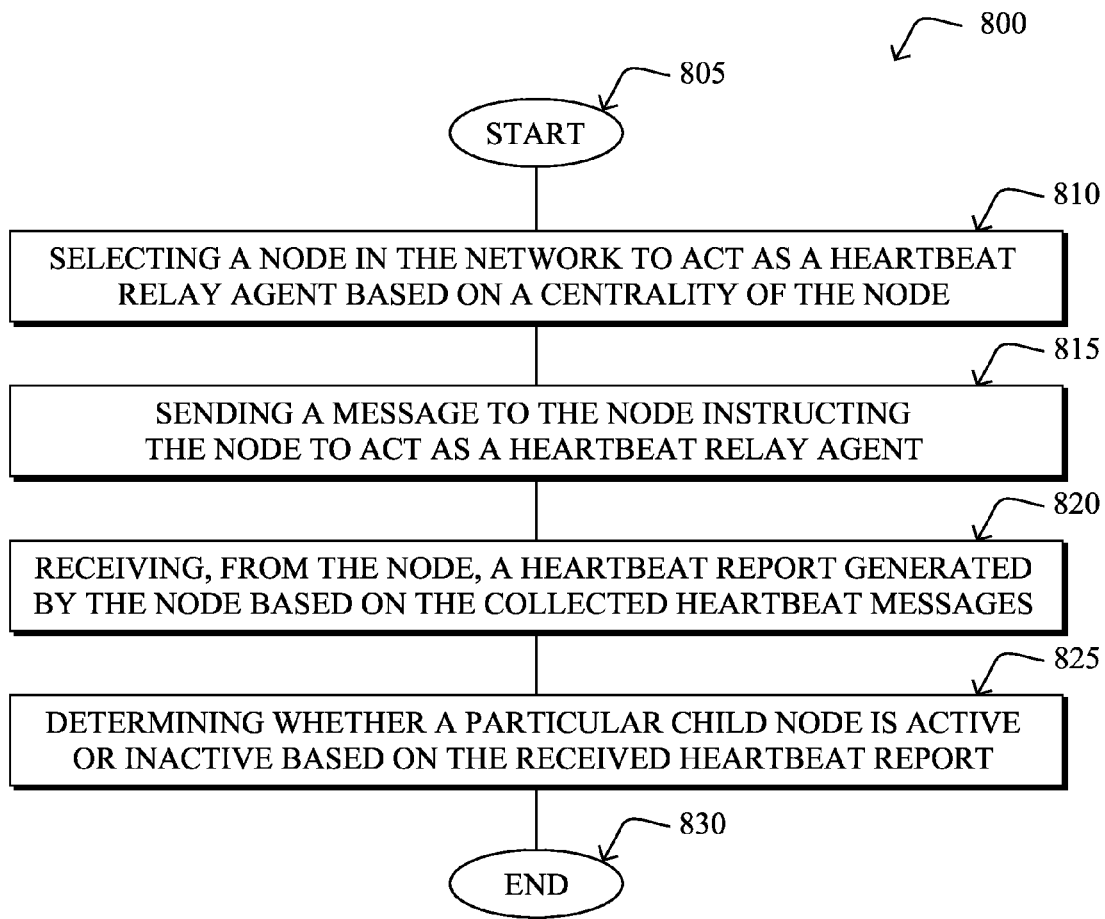
FIG. 8 illustrates an example simplified procedure for selecting a heartbeat relay agent and receiving the heartbeat report at a collecting node in the communication network.

FIG. 8 illustrates an example simplified procedure for selecting a heartbeat relay agent and receiving the heartbeat report at a collecting node in the communication network. As shown in FIG. 8, the procedure 800 may start at step 805, continue to step 810, and so forth, where, as described in greater detail above, a heartbeat relay agent is selected and a heartbeat report is received at a collecting node.

At Step 810, the procedure 800 includes selecting a node in a network to act as a heartbeat relay agent based on a centrality of the node. The heartbeat relay agent collects heartbeat messages from child nodes of the node, as described above. At Step 815, a message is sent to the node instructing the node to act as the heartbeat relay agent. At Step 820, a heartbeat report is received from the node, whereby the heartbeat report is generated by the node based on the collected heartbeat messages. At Step 825, it is determined whether a particular child node is active or inactive based on the received heartbeat report. The techniques by which the steps of procedure 800 are performed, as well as ancillary procedures, are described in detail above.

It should be understood that the steps shown in FIGS. 7 and 8 are merely examples for illustration, and certain steps may be included or excluded as desired. Further, while a particular order of the steps is shown, this ordering is merely illustrative, and any suitable arrangement of the steps may be utilized without departing from the scope of the embodiments herein. Moreover, while the procedures 700 and 800 are described separately, certain steps from each procedure may be incorporated into each other procedure, and the procedures are not meant to be mutually exclusive.

The techniques described herein, therefore, provide for significantly reduced channel usage, while maintaining timely heartbeat transmissions to keep availability information as close as possible to the real behavior. Further, the heartbeat transmissions and subsequent liveness determination may be localized to sub-DAGs, thereby increasing overall operating efficiency. Even further, multiple heartbeat relay agents may be advantageously selected based on their importance and location.

While there have been shown and described illustrative embodiments that provide for cumulative node heartbeat relay agents in computer networks, it is to be understood that various other adaptations and modifications may be made within the spirit and scope of the embodiments herein. For example, the embodiments have been shown and described herein primarily with relation to LLN networks. However, the embodiments in their broader sense are not as limited, and may, in fact, be used with other types of networks and/or protocols.

Moreover, the foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as an apparatus that comprises at least one network interface that communicates with a network, e.g., an LLN, a processor coupled to the at least one network interface, and a memory configured to store program instructions executable by the processor. Further, it is expressly contemplated that the components and/or elements described herein can be implemented as software being stored on a tangible, non-transitory computer-readable medium (e.g., disks/CDs/RAM/EEPROM/etc.) having program instructions executable by a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a particular node in a network, a message instructing the particular node to act as a heartbeat relay agent, the particular node being selected to receive the message based on a centrality of the particular node;
   collecting heartbeat messages from child nodes of the particular node in the network, the heartbeat message indicating a liveness of a corresponding child node;
   generating a heartbeat report based on the collected heartbeat messages; and
   transmitting the heartbeat report to a collecting node in the network.

2. The method as in claim 1, further comprising:
   determining whether to indicate in the heartbeat report a list of child nodes from which a heartbeat message was received, or a list of child nodes from which a heartbeat message was not received; and
   encoding the determined list in the heartbeat report.

3. The method as in claim 2, further comprising:
   receiving, from the collecting node, a message instructing the particular node to indicate in the heartbeat report the list of child nodes from which a heartbeat message was received, or the list of child nodes from which a heartbeat message was not received.

4. The method as in claim 2, wherein the determining is based on at least one of: i) a number of active child nodes, ii) a frequency of heartbeat message transmissions, iii) an amount of congestion in the network, iv) a topology of the network, v) a stability of the network, and vi) the centrality of the particular node.

5. The method as in claim 2, further comprising:
   receiving a message indicating that a child node has migrated to another area of the network; and
   removing the child node from the list upon receipt of the indication.

6. The method as in claim 2, when the heartbeat report includes the list of child nodes from which a heartbeat message was not received, further comprising:
   removing a child node from the list when the child node has been included in the list for a number of consecutive transmissions which exceeds a predetermined threshold.

7. The method as in claim 1, wherein the particular node is one of a plurality of nodes instructed to act as heartbeat relay agents.

8. A method, comprising:
   selecting a node in a network to act as a heartbeat relay agent based on a centrality of the node, the heartbeat relay agent collecting heartbeat messages from child nodes of the node, the heartbeat message indicating a liveness of a corresponding child node;
   sending, to the node, a message instructing the node to act as the heartbeat relay agent;
   receiving, from the node, a heartbeat report generated by the node based on the collected heartbeat messages; and
   determining whether a particular child node is active or inactive based on the received heartbeat report.

9. The method as in claim 8, further comprising:
   computing the centrality of the node based on at least one of: i) a topology of the network, ii) an amount of congestion in the network, and iii) a stability of the network.

10. The method as in claim 8, further comprising:
    sending, to the node, a message instructing the node to indicate in the heartbeat report a list of child nodes from which a heartbeat message was received, or a list of child nodes from which a heartbeat message was not received.

11. An apparatus, comprising:
    one or more network interfaces that communicate with a network;
    a processor coupled to the one or more network interfaces and configured to execute a process; and
    a memory configured to store program instructions which contain the process executable by the processor, the process comprising:
        receiving, at a particular node in the network, a message instructing the particular node to act as a heartbeat relay agent, the particular node being selected to receive the message based on a centrality of the node;
        collecting heartbeat messages from child nodes of the particular node in the network, the heartbeat message indicating a liveness of a corresponding child node;
        generating a heartbeat report based on the collected heartbeat messages; and
        transmitting the heartbeat report to a collecting node in the network.

12. The apparatus according to claim 11, wherein the process further comprises:
    determining whether to indicate in the heartbeat report a list of child nodes from which a heartbeat message was received, or a list of child nodes from which a heartbeat message was not received; and
    encoding the determined list in the heartbeat report.

13. The apparatus according to claim 12, wherein the process further comprises:
    receiving, from the collecting node, a message instructing the particular node to indicate in the heartbeat report the list of child nodes from which a heartbeat message was received, or the list of child nodes from which a heartbeat message was not received.

14. The apparatus according to claim 12, wherein the determining is based on at least one of: i) a number of active child nodes, ii) a frequency of heartbeat message transmissions, iii) an amount of congestion in the network, iv) a topology of the network, v) a stability of the network, and vi) the centrality of the node.

15. The apparatus according to claim 12, wherein the process further comprises:
    receiving a message indicating that a child node has migrated to another area of the network; and
    removing the child node from the list upon receipt of the indication.

16. The apparatus according to claim 12, when the heartbeat report includes the list of child nodes from which a heartbeat message was not received, further comprising:

removing a child node from the list when the child node has been included in the list for a number of consecutive transmissions which exceeds a predetermined threshold.

17. The apparatus according to claim 11, wherein the node is one of a plurality of nodes instructed to act as heartbeat relay agents.

18. An apparatus, comprising:
one or more network interfaces that communicate with a network;
a processor coupled to the one or more network interfaces and configured to execute a process; and
a memory configured to store program instructions which contain the process executable by the processor, the process comprising:
selecting a node in the network to act as a heartbeat relay agent based on a centrality of the node, the heartbeat relay agent collecting heartbeat messages from child nodes of the node, the heartbeat message indicating a liveness of a corresponding child node;
sending, to the node, a message instructing the node to act as the heartbeat relay agent;
receiving, from the node, a heartbeat report generated by the node based on the collected heartbeat messages; and
determining whether a particular child node is active or inactive based on the received heartbeat report.

19. The apparatus according to claim 18, wherein the process further comprises:
computing the centrality of the node based on at least one of: i) a topology of the network, ii) an amount of congestion in the network, and iii) a stability of the network.

20. The apparatus as in claim 18, wherein the process further comprises:
sending, to the node, a message instructing the node to indicate in the heartbeat report a list of child nodes from which a heartbeat message was received, or a list of child nodes from which a heartbeat message was not received.

* * * * *